United States Patent [19]

Shirley, Jr.

[11] Patent Number: 4,857,098
[45] Date of Patent: Aug. 15, 1989

[54] SULFUR-COATED FERTILIZER GRANULES AND PROCESS OF MAKING SAME

[75] Inventor: Arthur R. Shirley, Jr., Florence, Ala.

[73] Assignee: Pursell Industries, Sylacauga, Ala.

[21] Appl. No.: 84,039

[22] Filed: Aug. 11, 1987

[51] Int. Cl.$^4$ .......................... C05C 9/00; C05C 1/00; C05C 5/00

[52] U.S. Cl. ........................................ 71/28; 71/57; 71/64.06; 71/64.07; 71/64.11; 71/64.13; 428/403

[58] Field of Search ...................... 71/1, 28, 57, 64.02, 71/64.03, 64.06, 64.07, 64.11, 64.13; 428/403

[56] References Cited

U.S. PATENT DOCUMENTS

| | | |
|---|---|---|
| T912,014 | 7/1973 | Shirley, Jr. et al. |
| 3,100,698 | 8/1963 | Horsley et al. ................... 71/1 X |
| 3,295,950 | 1/1967 | Blouin et al. ........................ 71/64 |
| 3,576,613 | 4/1971 | Fleming ............................... 71/28 |
| 3,877,415 | 4/1975 | Blouin ............................... 118/303 |
| 3,903,333 | 9/1975 | Shirley, Jr. et al. ............. 427/212 |
| 3,991,225 | 11/1976 | Blouin ................................. 427/3 |
| 4,219,589 | 8/1980 | Niks et al. ...................... 71/64.13 |
| 4,330,319 | 5/1982 | Bexton et al. .................. 71/64.13 |
| 4,636,242 | 1/1987 | Timmons .............................. 71/28 |

FOREIGN PATENT DOCUMENTS

61-09888 8/1981 Japan ................................ 71/64.07

Primary Examiner—Ferris H. Lander
Attorney, Agent, or Firm—Cushman, Darby & Cushman

[57] ABSTRACT

Sulfur coated plant fertilizer granules, each such granule including a core granule of fertilizer having a crystalline component, a bonding layer having a mixture of the fertilizer granule crystalline component and crystalline sulfur, coating the granule, the bonding layer crystalline fertilizer component being integral with the fertilizer granule crystalline component at the bonding layer-granule interface, and an outer layer of sulfur having crystallized sulfur, the outer layer sulfur being integral with the bonding layer sulfur at the bonding layer-outer layer interface, the crystalline fertilizer component of the bonding layer and the sulfur of the bonding layer being interwoven, enabling the sulfur outer layer to be tightly bound to the fertilizer granule. A method for producing the granules includes the steps of applying molten fertilizer and molten sulfur, simultaneously, to the surface of the fertilizer granules such that the urea and sulfur solidify on the surface of said urea granules forming a layer including fertilizer and crystalline sulfur and then applying molten sulfur alone to the fertilizer-sulfur coated granules such that the sulfur solidifies as a second coating, forming an outer layer including crystalline sulfur, thus enabling the sulfur outer layer to be tightly bound to the fertilizer granules.

20 Claims, 2 Drawing Sheets

SULFUR-COATED FERTILIZER GRANULES AND PROCESS OF MAKING SAME

This invention relates to controlled-release, sulfur-coated particles of solid fertilizers wherein a special bonding layer between the fertilizer particle and the sulfur coating improves the resistance of the coating to physical damage during handling.

BACKGROUND AND SUMMARY OF THE INVENTION

The concepts of controlled-release fertilizers and of the use of sulfur coatings to impart the controlled-release characteristics to granules or particles of fertilizer are known. It is recognized, for example, that slowing the release of plant nutrients such as nitrogen from highly soluble fertilizer granules is desirable because releasing the nutrients over an extended period of time achieves advantages which include increased efficiency of fertilizer use by plants, reduction in cost by requiring fewer applications of fertilizer and reduction in nutrient losses caused by backing and denitrification. It is also recognized that application of a thin coating of sulfur on the fertilizer granules reduces the dissolution rate of the granules and hence imparts controlled-release characteristics. In essence, the water in the soil, and rain water are kept away from the very soluble fertilizer until a granule develops a flaw such as a crack or fissure in the coating, or the coating is penetrated by microbial action. When the fertilizer is initially put on the soil, some of the granules already have flaws which water can attack through capillary action and absorption for poorly covered or coated granules. Granules applied to the soil fail at different rates because the granules are not uniformly coated either from the standpoint of a specific granule or between granules. Thus, the time of failure of a granule and release of its nitrogen to the soil is different for different granules. Sulfur coated fertilizer, therefore, has its slow release characteristics based on the statistical pattern of failure for the granules.

In considering sulfur coated urea, for example, most of these products are made with not only a sulfur coating but also coatings of a wax or wax-like substances and a conditioner (a finely divided absorbent powder such as diatomaceous earth). The sulfur alone in these products gives very little slow release, rather, it acts as a prime coat which is then sealed by the wax. The conditioner gives the product free flowing characteristics and prevents sticking. These last two coatings, however, perform an additional function; they provide a cushioning effect to the granules and prevent the sulfur coating from cracking severely under normal bulk handling. If the coating does crack, a good sealant will flow into the crack and seal it during storage. Thus, some sulfur coated urea materials improve with storage.

There are different products, however, also known as sulfur coated urea. They contain no wax or conditioner and are commonly known as "Sulfur-Only" sulfur coated urea. The present invention provides an improvement to this kind of product. The process of the invention may also be of value in the conventionally sealed sulfur coated coated urea. For many years it was felt that such a sulfur-only product could not be made with an economically feasible amount of sulfur and still have good slow release properties. This was proven wrong by continued development efforts, however, the resulting products are very fragile, especially after the sulfur is allowed to age for several hours. Quick cooling and proper temperature control of the sulfur coated urea during production maximizes the elastic (amorphous) sulfur in the sulfur coating of the final product and gives the coating some minor resistance to breakage. Therefore, with normal handling, the coating cracks and the slow release characteristics are in large part destroyed. Granules with cracked coatings might slow the release of the urea and somewhat prevent burning of plants, but will not give the extended release over weeks and months which is desired for sulfur coated urea. Sulfur-only products are, nevertheless, superior to other coated fertilizers in some ways in that (1) they require much less equipment and manpower to make, (2) they are not dusty as they have no conditioner, and (3) they are not sticky as they have no wax.

The primary object of the present invention is to improve the bond between the sulfur coating and the fertilizer granule and to improve the strength of the sulfur coating, with the result that the coated granules have a reduced tendency to break or crack during storage and during normal handling. The coated granules therefore have more uniform controlled-release properties than prior sulfur-only coated granules, and the controlled-release properties are improved in the sense that nutrients are released over a longer time period than for prior sulfur-only coated granules.

According to the principles of this present invention these advantages are obtained by providing a special bonding layer between the inner core of fertilizer and the external sulfur coating, the bonding layer containing discrete but interwoven crystalline portions of sulfur and fertilizer with the fertilizer portion of the bonding layer being attached to the crystalline structure of the core and the sulfur portion of the bonding layer being attached to the crystalline structure of the subsequently applied sulfur coating. The sulfur coating and the fertilizer core are thus mechanically interwoven and fused together.

The bonding layer, to be effective, should be co-applied in the sense that the fertilizer component and the sulfur component of the layer are applied to the core simultaneously in order to ensure that the above-described mechanical bonds are obtained. This is best achieved by simultaneously spraying the two components in molten form onto the cores, either as separate sprays or as a mixed spray. Accordingly, the present invention includes the process of coating fertilizer particles by first co-spraying the particles with molten droplets of sulfur and fertilizer and then applying a coating of sulfur, also preferably by a melt-spraying technique.

The applicant is not aware of any prior teachings which are relevant to the above-summarized concepts of a special intermediate bonding layer for holding a sulfur coating to a fertilizer particle and of melt-spraying such intermediate bonding layer. The applicant is aware, however, of certain U.S. patents which relate to conventional fertilizer products and processes. U.S. Pat. No. 3,295,950 teaches the application of a coat of waxes and/or oils to fertilizer pellets as an undercoating, followed by a coating of sulfur and finally a sealant coating of the wax and/or oil.

U.S. Pat. Nos. 3,877,415 and 3,991,225 disclose an apparatus for spraying coating materials onto a continuous cascade of solid particles and a process for forming coated particles.

U.S. Pat. No. 3,903,333 discloses a process for sequentially applying sprays of coating materials (such as sulfur) to solid particles (e.g. urea). U.S. Defensive Publication No. T912,014 discloses a process for applying precisely uniform solid coatings onto solid particles by sequentially spraying the coating material onto the particles.

U.S. Pat. 3,576,613 discloses an improvement to the "contact" angle between sulfur and urea at the coating interface in sulfur coated particles, further involving the addition of a finely divided powder, in particular, carbon black, to the surface of the particle substrate.

U.S. Pat. No. 4,330,319 discloses a process for mixing molten urea and sulfur to produce solid particles of the mixture (No coating is involved).

None of the above documents suggest the novel features of the present invention.

DETAILED DESCRIPTION OF THE INVENTION

As summarized above the present invention provides a special two-component bonding layer between the urea fertilizer particle and the external sulfur coating so that the crystalline structures of the two materials in the bonding layer are distinct, but mechanically interwoven. The fertilizer component of the bonding layer attaches to and becomes integral with the crystalline structure of the fertilizer granule and the subsequently applied substantially pure, outer sulfur coating attaches to and becomes integral with the crystalline structure of the sulfur component in the bonding layer. Thus, the coatings and the substrate are interwoven and fused together. The bonding layer is typically 10–90% by weight of sulfur and typically has a thickness of 5–100 microns.

The fertilizer particles to be sulfur coated may be any of a variety of known solid, particulate fertilizer materials which contain nutrients in a form available to plants. Urea is a particularly suitable material, as is ammonium nitrate and ammonium sulfate. The fertilizer component of the bonding layer will typically be the same fertilizer as the core.

In order to obtain the desired mechanical interlocking of the components of the bonding layer with each other and with the fertilizer core and the external sulfur coating, the bonding layer and sulfur coating are applied in the form of sprays of molten droplets, i.e., are melt-sprayed. The sulfur and fertilizer components of the bonding layer are sprayed simultaneously onto the fertilizer core particles in order to obtain the necessary interlocking of these two components. The components may be sprayed through separate nozzles or may be premixed and sprayed through one or more common nozzles. In either case the molten droplets solidify at a time such that interlocking of the crystals occurs. Solidification prior to contact with the core does not produce the necessary bond. The same is true of the exterior coating of sulfur.

Spraying may be accomplished pneumatically, hydraulically or electrostatically. Hydraulic spraying is typically carried out with a spraying pressure of about 10 to 3000 psig. The temperature of the molten urea is typically between the melting point of urea and 300° F. The temperature of the molten sulfur applied simultaneously with the molten urea or alone as the outer coating is typically between the melting point of sulfur and 320° F. The temperature of the fertilizer granules before the bonding layer is applied is typically between 40° F. and 210° F.

It is necessary to control the spraying operations carefully in order to achieve the required coatings. This can most easily be done by using a rotating drum spray-coating apparatus, although it is also possible to use a pan granulator, fluid bed apparatus or other coating equipment. A rotating drum coating apparatus such as is conventionally used for producing sulfur-only fertilizer granules by a spraying technique, is particularly suitable, as this kind of equipment is capable of producing uniform application of spray coatings. The coating operations can be batch operations or continuous operations.

A drum sprayer is, basically, a generally horizontal rotatable drum having internal lifting flights which lift the free-flowing particles in the drum and then let them fall to the bottom of the drum in the form of a continuously falling curtain. Stationary spray nozzles are positioned within the drum so as to project the sprayed material onto the curtain of falling particles. For a continuous process the drum is slightly inclined so that rotation of the drum causes the particles to move from the inlet end of the drum to the outlet end, where they are discharged.

The bonding layer and the subsequent exterior sulfur coating can be applied in the same or different drums. If both operations are carried out in a single drum, it is important not to let the spray which contains the fertilizer component of the bonding layer enter the downstream portion of the drum where the sulfur alone is being sprayed. This can be accomplished by providing a counter-current air flow in the portion of the drum where the bonding layer is being sprayed to rid the drum of mist and dust thereby keeping the fertilizer mist caused by overspray from getting into the downstream sulfur-spraying area of the drum. If a fluid bed coating apparatus is used, the fertilizer mist can easily be isolated from the sulfur coating area, as any spray not impinging on the granules in the bed around the fertilizer spray nozzles will be removed from the fluid bed vessel by upward flowing air currents.

A batch process can be carried out in a single drum by providing fertilizer spray nozzles and sulfur spray nozzles in a common area of the drum. After the co-spraying operation has been completed, the fertilizer nozzles can be turned off and the sulfur nozzles allowed to continue until the needed sulfur coating is applied.

Figure 1:
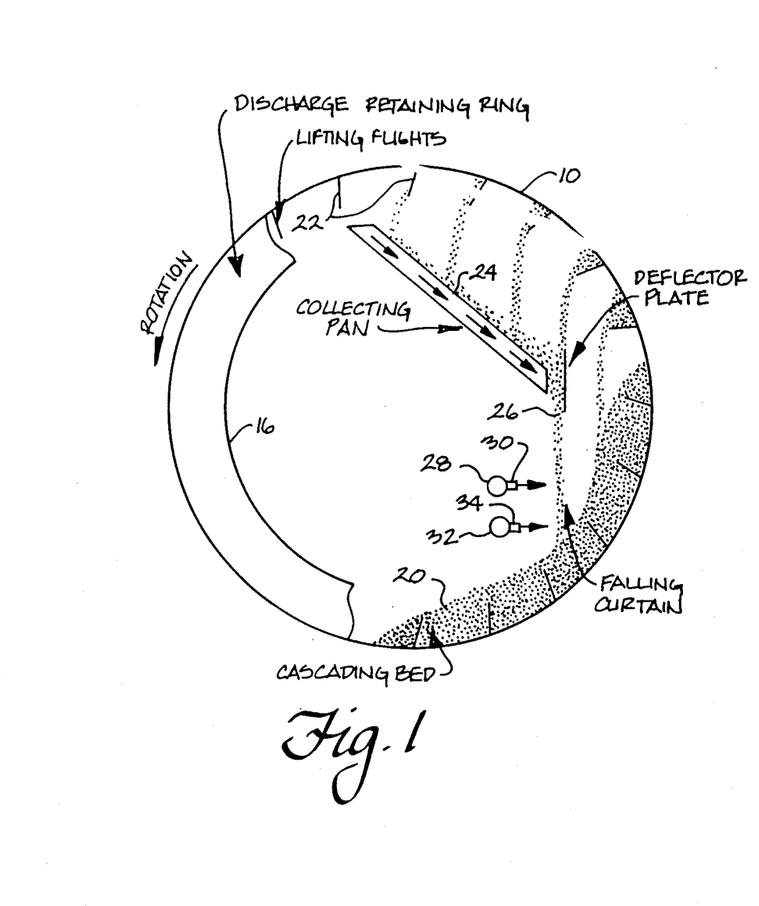
FIG. 1 is a transverse cross sectional view of a coating drum suitable for pray-coating fertilizer particles according to the present invention.
Figure 2:
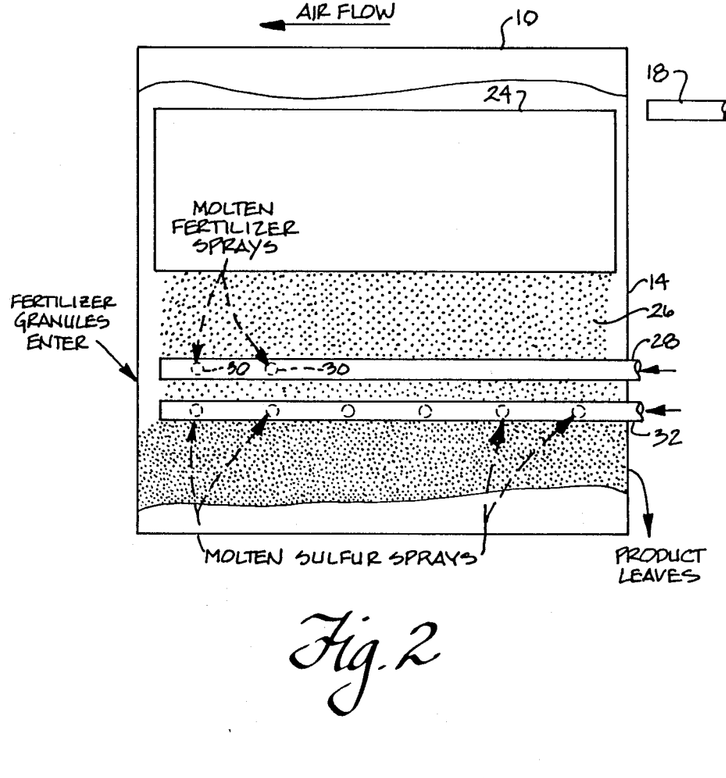
FIG. 2 is a longitudinal view of the drum of FIG. 1.

With reference to FIGS. 1 and 2 there is shown schematically a drum sprayer suitable for continuously producing sulfur coated fertilizer particles in accordance with the present invention. Use of the illustrated drum sprayer is not critical, however, as other drum sprayers are also suitable. The drum 10 is basically of the kind disclosed in the aforesaid U.S. patents 3877415 and 3991225. It has an inlet end 12 for receiving fertilizer particles and an outlet end 14 through which coated fertilizer particles are discharged over a discharge retaining ring 16. A rotary drive (not shown) is provided for supporting and rotating the drum 10 in a counter-clockwise direction as viewed in FIG. 1. Means schematically shown at 18 introduces air which flows countercurrent to the direction of travel of the fertilizer particles. As the drum 10 rotates, the fertilizer particles form a cascading bed 20. Lifting flights 22, carried on the interior of the drum wall and canted in the direction of drum rotation, continuously lift particles from the bed and, as the drum 10 rotates, the particles slide off the upper flights 22 and fall either back to the bed 20 or to an inclined collecting pan 24. The direction of inclination of the pan 24 is such that the fertilizer particles slide down the pan and form a falling curtain 26 of particles which return to the bed 20. A falling curtain of particles can be formed by lifting flights alone, and hence the use of the pan 24 is not essential.

Extending longitudinally within the drum 10 at a location adjacent the falling curtain are a molten fertilizer spray assembly 28, 30 and a molten sulfur spray assembly 32, 34, the elements 30 and 34 being nozzles which direct the molten material supplied through the pipes 28 and 32 toward the falling curtain 26 in the form of fine molten droplets. The fertilizer spray nozzles 30 are provided only in the upstream part of the drum 10, and the sulfur spray nozzles 34 are provided in both the upstream and downstream parts of the drum 10.

In operation of the apparatus the drum 10 rotates continuously and solid fertilizer particles are continuously fed into the inlet end 12 where they are formed by the flights 22 and the pan 24 into the falling curtain 26 which extends essentially the whole length of the drum 10. Simultaneously the particles travel toward the discharge end 14 of the drum 10. In the upstream part of the drum 10 the nozzles 30 spray molten fertilizer droplets onto the fertilizer particles in the falling curtain. Simultaneously the nozzles 34 spray molten sulfur droplets onto the falling curtain particles. The result is that in the upstream part of the drum 10 the solid fertilizer particles become coated with a layer of fertilizer crystals and sulfur crystals, the fertilizer component of the layer becoming integral with the surface of the solid fertilizer particles. A stream of air moving through the drum 10 from rear to front prevents excess fertilizer droplets from passing into the rear part of the drum. The thus-layered fertilizer particles are then coated with sulfur in a similar manner by molten sulfur droplets being sprayed from those nozzles 34 which are downstream of the fertilizer nozzles 30. As the sulfur droplets solidify on the layered particles, sulfur crystals in the coating interweave with sulfur crystals in the fertilizer/sulfur layer thus tightly bonding the sulfur layer to the particles.

Figure 3:
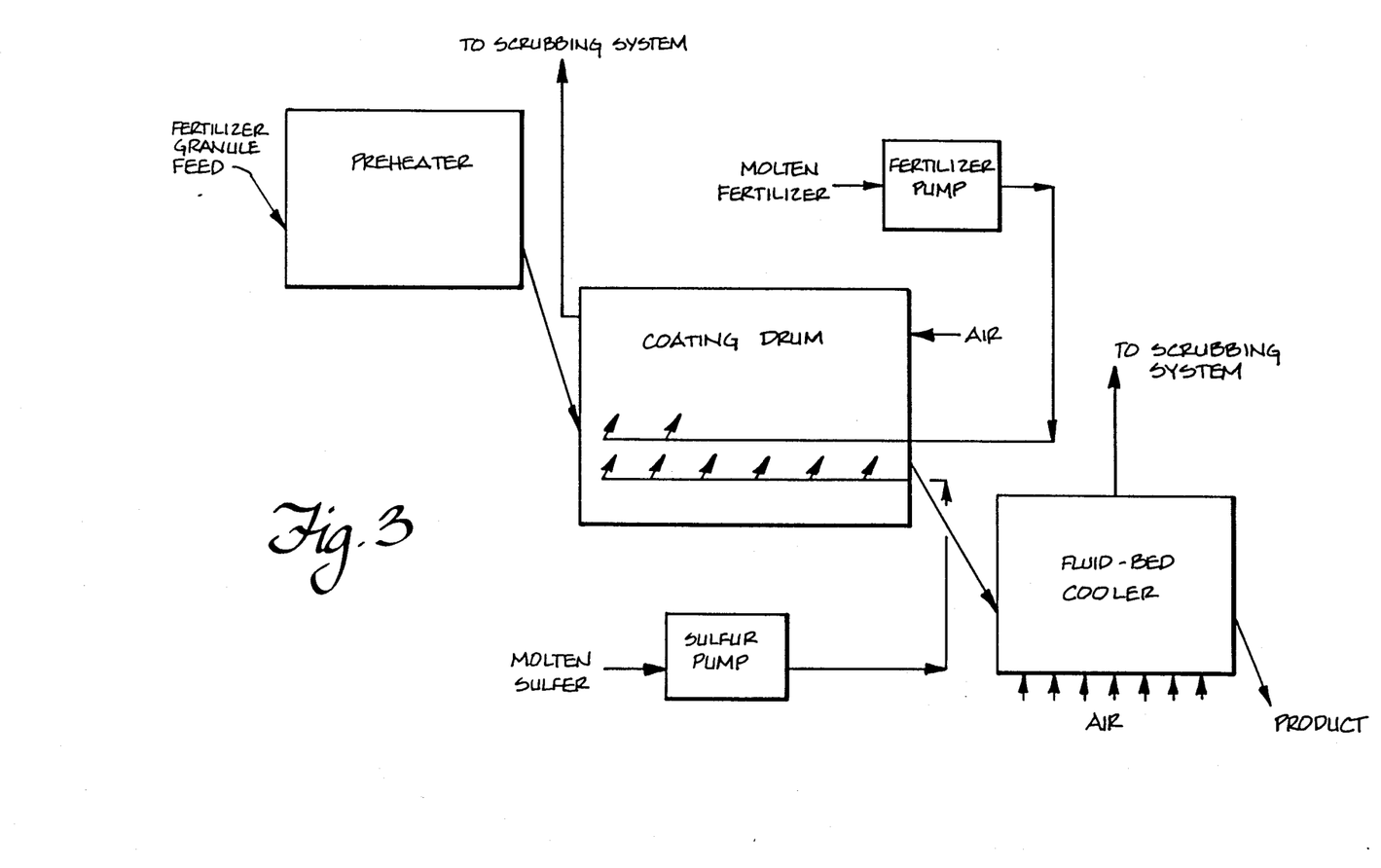
FIG. 3 is a flow diagram of an overall manufacturing scheme of the sulfur coated fertilizer particles of the present invention.

FIG. 3 illustrate in flow sheet form a manufacturing plant for continuously producing sulfur coated fertilizer particles, using the coating drum 10 described above. It is desirable to preheat the fertilizer particles in a preheater to enhance the attachment thereto of the fertilizer/sulfur bonding layer, although the temperature of the fertilizer particles should not be raised sufficiently to make the particles tacky. From the preheater the hot particles are fed continuously to the inlet end 12 of the drum 10. Coated hot particles, produced as described above, are discharged from the discharge end 14 of the drum to a fluid bed cooler in which they are maintained in fluid bed condition and cooled by an upwardly moving stream of cooling air. The cooled particles are discharged from the cooler as product. Conventional equipment may be used for scrubbing the air streams from the drum 10 and from the cooler, as well as for melting the fertilizer and sulfur and pumping the molten materials to the nozzles 30 and 34.

EXAMPLES

A coating drum as illustrated in the drawings was used to coat urea granules with sulfur only and in other runs to coated the urea granules first with a urea/sulfur bonding layer and then with a sulfur layer. The sulfur-only granules and the layered/coated granules were subjected to impact tests the results of which showed that the sulfur coating on the layered granules resisted cracking of the sulfur coating to a significantly higher degree than the sulfur-only granules. The layered/coated granules therefore have improved delayed-release characteristics when applied to the soil.

Data for eight runs are contained in the Table. Runs 9, 10-A, 10-B, 10-C, 13 and 14 are sulfur-only runs. Runs 12-A and 12-B are layered/coated runs carried out in accordance with the present invention. The improved results using the layered/coated technique are apparent from comparing the Impact Test Results of Runs 12-A and 12-B with the other runs.

The 7-day dissolution rate of a sulfur coated urea is a known test and is a measure of how much of the urea will go into aqueous solution from a 50 gram sample of material held at 100° F. for 7 days time. This does not necessarily reflect what the material will do in the soil but rather gives a comparison between sulfur coated products. The lower the 7-day dissolution rate, the slower the nitrogen release and longer an application to the soil will last. Dissolution rates between 20 and 50 are usually sought depending on the targeted market for the fertilizer.

The impact test referred to in the Table involves dropping the granules to be tested 4 feet to impact on a steel plate positioned at a 68 degree angle with the line of fall of the granules. The granules are fed slowly and in such a manner that each individual granule strikes the plate. The impacted granules are then tested for dissolution rate in water although the dissolution test is not the same as the 7-day dissolution test. The impact test should be performed on product granules aged for a minimum of 7 days because sulfur becomes brittle with age. The impact tests reported in the Table were performed after the granules had been aged for at least three weeks. Although the crystalline structure of sulfur may continue to change beyond three weeks, the rate and thus the degree of change is very slow thereafter. The details of how the 7-day dissolution test and the impact test are carried out are of no importance to the present invention and are therefore not described further. The significant point is that the granules obtained from each run were subjected to the same tests, so that the results of the tests are meaningful for comparison purposes.

The major variables in the co-spray technique and coating layer formation involved are listed below:

1. In considering the degree of atomization of the sprays of urea and sulfur, the sulfur is highly atomized at 1200 lbs/in$^2$ of spraying pressure as it emanates from the flat spray pattern type nozzles used in the test. However, any reasonable amount of atomization would probably have a desirable effect. In the tests, urea was sprayed at approximately 100 lbs/in$^2$ of pressure, thus, not so finely atomized. In using very fine urea-sulfur dispersion, the urea and sulfur would be mixed before spraying.

2. With respect to the ratio of sulfur to urea which is applied in the bonding layer, it would appear from the heat of fusions for sulfur and urea, about 17 BTU/lb and 104 BTU/lb respectively, that sulfur crystals are weaker than urea crystals, thus, the interface bonding layer would need more sulfur than urea. In view of this, tests 12-A and 12-B employed a spraying ratio of molten sulfur to molten urea of 2.5 lb sulfur/lb urea. A lower ratio of sulfur to urea may provide acceptable results. The sulfur in the bonding layer dilutes the nitrogen content of the final product, which is undesirable.

3. In considering the amount of bonding mixture which must be applied, theory indicates that the bonding layer must have sufficient thickness for the interweave of the crystals of sulfur and urea in order to be effective. Bonding layer thickness may be as low as 5 microns.

4. With respect to the temperature of the urea granules and the urea and sulfur melt at time of bonding layer application, the lower the substrate temperature, the more effective the process. This is because the solidifying urea with its high heat of fusion could be used to preheat the substrate for proper sulfur coating. The urea granules should be greater than 40° F. for optimum bonding. The substrate temperature is preferably between 40° F. and 195° F., but as high as 210° F., to ensure an effective bonding layer. Urea and sulfur need only to be molten to be effective. A temperature of molten sulfur above 320° F. may be ineffective. At a temperature above 300° F. urea begins to decompose, forming ammonia gas at a rapid rate which could have a deleterious effect on the coating.

As discussed above, the tests showing co-spraying of urea and sulphur to form a bonding layer consist of two tests (Runs 12-A and 12-B) performed consecutively with the only difference being a rate increase in the granular urea fed to the test plant. The subsequent sulfur coating appears to be more tightly bonded to the urea granules than in comparative tests such as tests 9 and 10. Conclusive results were obtained through use of the impact test. A description of this test is attached, "SCU Impact Test Part I and Part II", ACT Rev. 1.

Sulfur-coated granules with 36% total sulfur content and a 63 micron urea-sulfur bonding layer (Run 12-A) were found to be very resistant to cracking. Granules tested by a dissolution rate test, before and after impact, only increased an average of 9.5 percentage points out of four tests with no sample showing a change over 11.4 percentage points. When the total sulfur content was 25%, with a 38 micron urea-sulfur bonding layer (Run 12-B), the impact resistance was not quite as good with a 14.3 percentage point increase out of eight tests and the highest increase being 25 percentage points. In all impact tests testing other sulfur coated urea products, the increase in dissolution rate caused by the impact test was much higher. The average percentage point increase was 40.9. No test resulted in less than a 26.8 percentage point increase, but many had increases of over 50 percentage points. These values varied for total sulfur coatings of from 40.1% sulfur to 18.5% sulfur.

SULFUR-COATED UREA

Impact Test (Part I)

ACT 2-5-87

Rev. 1

Procedure

1. Weight a normal 50 g sample of sulfur coated urea (SCU) to the nearest milligram; drop the sample from a height of 48" onto a steel plate positioned in a 5 gallon container and at an angle of 22° from the horizontal. The sample should be dropped in a manner such that each individual granule impacts on the plate and not on other granules.

2. Drop the sample a second time from 48" onto the plate in the container.

3. Transfer the sample to a 500 ml, high density, wide mouth Nalgene bottle.

4. Add a nominal 250 g of distilled water (to the nearest 0.01 g) to the Nalgene bottle.

5. Place the bottle on a Burrell shaker and set the intensity on 3.

6. Position the bottle in a Magni-Whirl water bath and shake the sample for 15 minutes at 70° C.

7. Remove the sample from the bath and pipet a volume of solution using a disposable pipet.

8. Filter a few drops of solution through a folded 9 cm, #541 Whatman filter paper directly onto the stage of an Abbe refractometer.

9. Read the refractive index, noting the temperature, and correct to 30? C.

Calculations:

1. Urea in solution, % =

$$\frac{(n_D @ 30° C.), \text{average} - 1.3319}{\text{standard slope} (= \Delta n_D @ 30° C./\Delta \% \text{urea})}$$

1.a Urea in solution, % =

$$\frac{(n_D @ 30° C.) - 1.3323}{0.001450303 (= \Delta n_D @ 30° C./\Delta \% \text{urea})}$$

2. Water in solution, % = 100 − urea in solution, %

3. Weight of urea in sample of SCU, g =

$$\frac{(100 - \text{total coating } \%)(\text{weight of sample of } SCU)}{100}$$

4. Weight of urea in solution, g =

$$\frac{(\text{urea dissolved, }\%)(\text{wt. of water, g})}{\text{water in solution, }\%}$$

5. Dissolution rate, % = $\frac{\text{wt. of urea in solution}}{\text{wt. of urea in sample}} \times 100$ Report answer to nearest 0.1%.

Compare dissolution rate from Impact Test (Part I) to the rate from Impact Test (Part II)

SCU Impact Test (Part II)

ACT 4-23-85

Rev. 1

Procedure

1. Weigh a nominal 50 g sample of SCU (to the nearest milligram) into a 500 ml, high-density, wide mouth, Nalgene bottle.

2. Transfer 250 ml of water (to the nearest 0.01 g) to the bottle.

3. Place the bottle on a Burrell shaker and set the intensity on 3.

4. Position the bottle in a Magni-Whirl water bath and shake the sample for 15 minutes at 70° C.

5. Remove the sample from the bath and pipet a volume of solution, using a disposable pipet.

6. Filter a few drops of solution through a folded 9 cm, #541 Whatman filter paper directly onto the stage of an Abbe refractometer.

7. Read the refractive index, noting the temperature, and correct to 30° C.

Calculations:

1. Urea in solution, % =

$$\frac{(n_D \text{ @ 30° C., average} - 1.3319)}{\text{standard slope } (= \Delta n_D \text{ @ 30° C.}/\Delta \text{ % urea})}$$

1a. Urea in solution, % =

$$\frac{(n_D \text{ @ 30° C.}) - 1.3323}{0.001450303 \, (= \Delta n_D \text{ @ 30° C.}/\Delta \text{ % urea})}$$

2. Water in solution, % = 100 urea in solution, %

3. Weight of urea in sample of SCU, g =

$$\frac{(100 - \text{total coating \%})(\text{weight of sample of } SCU)}{100}$$

4. Weight of urea in solution, g =

$$\frac{(\text{urea dissolved, \%})(\text{wt. of water, g})}{\text{water in solution, \%}}$$

5. Dissolution rate, % = $\frac{\text{wt. of urea in solution}}{\text{wt. of urea in sample}} \times 100$ Report answer to nearest 0.1%.

TABLE 1
SULFUR-COATED UREA TESTS
Operating Data

| Test No. | 9 | 10-A | 10-B | 10-C | 12-A | 12-B | 13 | 14 |
|---|---|---|---|---|---|---|---|---|
| Flow Rates: | | | | | | | | |
| Urea Granule Feed Rate, lb/hr | 1300-2000 | 1130 | 1200 | 1620 | 694 | 1159 | 1423 | 1200 |
| Urea Melt Spray Rate, lb/hr | None | None | None | None | 57 | 58 | None | None |
| Sulfur Spray Rate, lb/hr | 495 | 431 | 406 | 424 | 423 | 429 | 420 | 400 |
| Product Rate, lb/hr | 1950-2560 | — | — | — | 1110 | 1770 | 1920 | 1600 |
| Temperatures | | | | | | | | |
| Preheater Discharge, °F. | 147-153 | 169 | 164 | 155-157 | 158-159 | 139-146 | 130 | 138 |
| Coated Granules Leav. Drum, °F. | 169-176 | 179-182 | 180 | 175 | 187-191 | 180-186 | 134 | 166-173 |
| Granules Leav. Fluid Bed Cooler, °F. | 133-140 | 124 | 134 | 134 | 120 | 130 | 106 | 130 |
| Temp. of Sulfur at Spray Nozzles, °F. | 311-312 | 313 | 312 | 312 | 310 | 309 | 310 | 310 |
| Temp. of Urea Melt at Spray Nozzles, °F. | — | — | — | — | 290 | 290 | — | — |
| Temp. of Air Ent. Fluid Bed, °F. | 86-87 | 87 | 88 | 89ª | 81 | 81 | 88 | 92 |
| Temp. of Air Leav. Fluid Bed, °F. | 129-137 | 120-122 | 132 | 129-131 | 117 | 127 | 104 | 127 |
| Pressures | | | | | | | | |
| Sulfur Spray, psig | 1190-1210 | 1180-1190 | 1170 | 1180 | 1025 | 1030 | 1200 | 1190 |
| Urea Spray, psig | — | — | — | — | 100 | 112 | — | — |
| Coating Drum | | | | | | | | |
| Dia, ft. | 4 | 4 | 4 | 4 | 4 | 4 | 4 | 4 |
| Length, ft. | 4 | 4 | 4 | 4 | 4 | 4 | 4 | 4 |
| RPM | 10 | 10 | 10 | 10 | 11 | 11 | 11 | 11 |
| No. Flights | 20 | 20 | 20 | 20 | 20 | 20 | 20 | 20 |
| Flight Height, inch | 3 | 3 | 3 | 3 | 3 | 3 | 3 | 3 |
| Retaining Ring Height, inch | 5 3/16 | 5 3/16 | 5 3/16 | 5 3/16 | 5 3/16 | 5 3/16 | 5 3/16 | 5 3/16 |
| Sulfur Spray Nozzles | | | | | | | | |
| Type | Uni jet | Uni jet | Uni jet | Uni jet | Uni jet | Uni jet | Uni jet | Uni jet |
| No/Size | 2(650033) & 4(650017) | 6(650017) | 6(650017) | 6(650017) | 6(650017) | 6(650017) | 6(650017) | 6(650017) |
| Position | 1 & 2 3,4,5,&6 | 1 thru 6 | 1 thru 6 | 1 thru 6 | 1 thru 6 | 1 thru 6 | 1 thru 6 | 1 thru 6 |
| Distance to Curtain, inch | 4 | 4 | 4 | 4 | 4 | 4 | 4 | 4 |
| Distance Above Curtain Bed Interface, inch | 2 | 2 | 2 | 2 | 2 | 2 | 2 | 2 |
| Urea Spray Nozzles | | | | | | | | |
| Type | — | — | — | — | Uni jet | Uni jet | — | Uni jet |
| No/Size | — | — | — | — | 2(650033) | 2(650033) | — | — |
| Position | — | — | — | — | 1 and 2 | 1 and 2 | — | — |
| Distance to Curtain, inch | — | — | — | — | 4" | 4" | — | — |
| Distance Above Curtain Bed Interface, inch | — | — | — | — | 6" | 6" | — | — |
| Urea Spray/Sulfur Spray Orientation | — | — | — | — | Urea Noz. Directly above sulfur Nozzles 1 and 2 | | — | — |
| Urea | | | | | | | | |
| Source | TVAᵈ | TVAᵈ | TVAᵈ | TVAᵈ | TVAᵈ | TVAᵈ | TVAᵈ | TVAᵈ |
| Type | Falling Curtain | Falling Curtain | Falling Curtain | Falling Curtain | Falling Curtain | Falling Curtain | Falling Curtain | Falling Curtain |
| Size (Surface Area, in²/lb) | 1440 | 1440 | 1440 | 1440 | 1440 | 1440 | 1440 | 1440 |
| Sulfur | | | | | | | | |
| Source | Staufferᵇ | Staufferᵇ | Staufferᵇ | Staufferᵇ | Staufferᵇ | Staufferᵇ | Staufferᵇ | Staufferᵇ |
| Type | Frasch | Frasch | Frasch | Frasch | Frasch | Frasch | Frasch | Frasch |
| Air Flow Direction in Coating Drum | Co Current | Counter-Current | Counter-Current | Counter-Current | Counter-Current | Counter-Current | Counter-Current | Counter-Current |

TABLE 1-continued

SULFUR-COATED UREA TESTS
Operating Data

| Test No. | 9 | 10-A | 10-B | 10-C | 12-A | 12-B | 13 | 14 |
|---|---|---|---|---|---|---|---|---|
| Laboratory Results | | | | | | | | |
| 7-Day Dissolution Rate, % (avg.) | 5.8—54.9 (31.1) | 3.8–4.9 (4.4) | 16.7 | 20.9–23.3 (22.1) | 27.2–29.9 (28.7) | 55.8–62.8 (58.8) | 38.9 | 19.6–29.1 (24.4) |
| Total Coating, % (avg.) | 36.9–18.5 (25.5) | 40.0–40.1 (40.1) | 31.5 | 26.6–27.5 (27.1) | 35.1–37.4 (35.8) | 23.6–28.3 (25.0) | 23.7 | 22.5–25.6 (24.1) |
| Urea Free Total Coating, % (avg.) | 36.9–18.5 (25.5) | 40.0–40.1 (40.1) | 31.5 | 26.6–27.5 (27.1) | 29.9–28.8 (27.3) | (19.0) | 23.7 | 22.5–25.6 (24.1) |
| Nitrogen, % | 29–37.5 (34.3) | 27.6 | 31.5 | 33.8–33.4 (33.6) | 29.9–28.8 (29.5) | 35.1–33.0 (34.5) | | |
| Urea-Sulfur Bond Layer Thickness, microns | None | None | None | None | 63 | 38 | None | None |
| Impact Test Results | | | | | | | | |
| Diss. Rate Before Impact, % (avg) | .03–20.5 (8.4) | 0.0–0.2 (0.1) | 2.0 | 3.3–3.8 (3.6) | 0.6–2.1 (1.4) | 10.2–22.9 (13.6) | 12.5 | 6.5–15.2 (10.9) |

What is claimed is:

1. Sulfur coated urea granules having improved resistance to physical damage during handling, each such granule comprising:
   a granule of urea including crystalline urea;
   a bonding layer including a mixture of crystalline urea and crystalline sulfur, coating said urea granule, said bonding layer crystalline urea being integral with said crystalline granule urea at the bonding layer-granule interface; and
   an outer layer of sulfur including crystallized sulfur, said outer layer of sulfur being integral with said bonding layer sulfur at the bonding layer-outer layer interface, said crystalline urea and sulfur of said bonding layer being interwoven, enabling said sulfur outer layer to be tightly bound to said urea granule.

2. The granule of claim 1 wherein said sulfur of said bonding layer is present in a concentration between about 10 to 90% weight of the bonding layer.

3. The granule of claim 1 wherein said bonding layer has a thickness between about 5 to 100 microns.

4. A sulfur coated plant fertilizer granule having improved resistance to physical damage during handling comprising:
   a granule of fertilizer including a crystalline component;
   a bonding layer including a mixture of said fertilizer granule crystalline component and crystalline sulfur, coating said granule, said bonding layer crystalline fertilizer component being integral with said fertilizer granule crystalline component at the bonding layer-granule interface; and
   an outer layer of sulfur including crystallized sulfur, said outer layer sulfur being integral with said bonding layer sulfur at the bonding layer-outer layer interface, said crystalline fertilizer component of said bonding layer and said sulfur of said bonding layer being interwoven, enabling the sulfur outer layer to be tightly bound to the fertilizer granule.

5. The fertilizer granule of claim 4 wherein said sulfur of said bonding layer is present in a concentration between about 10 to 90 weight percent.

6. The fertilizer granule of claim 4 wherein said bonding layer has a thickness between about 5 to 100 microns.

7. A method of producing sulfur coated urea granules having improved resistance to physical damage during handling comprising the following steps:
   applying molten urea and molten sulfur, simultaneously to the surface of urea granules such that said urea and sulfur solidify on the surface of said urea granules forming a layer including urea and crystalline sulfur; and
   applying molten sulfur alone to the urea-sulfur coated urea granules such that said sulfur solidifies as a second coating, forming an outer layer including crystalline sulfur, thus enabling the sulfur outer layer to be tightly bound to said urea granules.

8. The process of claim 7 wherein said simultaneously applied molten urea and molten sulfur are premixed before application and are applied together.

9. The process of claim 7 wherein said simultaneously applied molten urea and molten sulfur are applied independently of each other.

10. The process of claim 9 wherein said molten urea and molten sulfur are applied by independent and simultaneous, co-spraying.

11. The process of claim 8 wherein said premixed molten urea and molten sulfur are applied by spraying.

12. The process according to claim 9 wherein said spraying is by pneumatic, hydraulic or electrostatic means.

13. The process according to claim 12 wherein said spraying pressure is between about 10 to 3000 psig.

14. The process according to claim 11 wherein said spraying is by pneumatic, hydraulic or electrostatic means.

15. The process according to claim 14 wherein said spraying pressure is between about 10 to 3000 psig.

16. The process according to claim 7 wherein said molten urea has a temperature between that of the melting point of urea and 300° F.

17. The process according to claim 7 wherein the temperature of said molten sulfur simultaneously applied with said molten urea or said molten sulfur applied alone has a temperature between that of the melting point of sulfur and 320° F.

18. The process according to claim 7 wherein the temperature of said granules before being coated by said simultaneous application of molten urea and molten sulfur is between about 40° F. and 210° F.

19. The process of claim 7 wherein said production of sulfur coated granules is a continuous process, said molten urea and molten sulfur being simultaneously sprayed onto the surface of said urea granules within an enclosed apparatus, said urea granules falling through said sprays as a curtain of granules with subsequent and separate spraying of molten sufur, alone, with force ventilation of spray mist from said molten urea and sulfur, to prevent inclusion of urea in subsequent sulfur coating.

20. The process of claim 7 wherein said production of sulfur coated granules is a batch process, said molten urea and molten sulfur being simultaneously sprayed onto the surface of said urea granules within an enclosed apparatus said molten urea spray ending once co-spraying of molten urea and sulfur is finished, said sulfur spraying continuing alone to build the required sulfur coating.

* * * * *